United States Patent [19]
Kohler

[11] Patent Number: 5,887,264
[45] Date of Patent: Mar. 23, 1999

[54] TELECOMMUNICATION PROCESS AND DEVICE SUITABLE FOR CARRYING OUT THE PROCESS

[75] Inventor: Mathias Kohler, Bochum, Germany

[73] Assignee: Nokia Mobile Phones, Salo, Finland

[21] Appl. No.: 712,631

[22] Filed: Sep. 13, 1996

[30] Foreign Application Priority Data

Sep. 29, 1995 [EP] European Pat. Off. .............. 95115485

[51] Int. Cl.⁶ ............................ H04Q 7/22; H04M 1/274
[52] U.S. Cl. ........................... 455/461; 455/435; 455/560
[58] Field of Search ................................. 455/414, 432, 455/433, 435, 445, 461, 551, 560

[56] References Cited

U.S. PATENT DOCUMENTS

| | | | |
|---|---|---|---|
| 5,054,110 | 10/1991 | Comroe et al. | 455/435 |
| 5,267,308 | 11/1993 | Jokinen et al. | 379/354 |
| 5,384,824 | 1/1995 | Alvesalo | 455/456 |
| 5,448,622 | 9/1995 | Huttunen | 379/58 |
| 5,467,381 | 11/1995 | Peltonen et al. | 455/432 |
| 5,479,476 | 12/1995 | Finke-Anlauff | 379/58 |
| 5,485,635 | 1/1996 | Paavonen | 455/515 |
| 5,509,052 | 4/1996 | Chia et al. | 455/465 |

FOREIGN PATENT DOCUMENTS

| | | |
|---|---|---|
| 0 238 257 | 9/1987 | European Pat. Off. . |
| 0 394 811 | 10/1990 | European Pat. Off. . |
| 40 26 179 | 2/1992 | Germany . |
| 2 198 910 | 6/1988 | United Kingdom . |
| WO 94/10781 | 5/1994 | WIPO . |

OTHER PUBLICATIONS

Patent Abstracts of Japan vol. 95 No. 7, 31, Aug. 1995 & JP–A–07 095277 "Electronic Telephone Directory System" Hamada Shigeru, 7, Apr. 1995.

*Primary Examiner*—Willis R. Wolfe
*Assistant Examiner*—Hieu T. Vo
*Attorney, Agent, or Firm*—Perman & Green

[57] ABSTRACT

A process of telecommunication between a plurality of subscriber stations in accomplished under control of a switching center which stores call numbers of the respective subscriber stations. Each of the subscriber stations requests registration with an additional subscriber identification at the switching center. The switching center assigns the additional subscriber identification to the respective call number. In addition, the switching center transfers to each of the subscriber stations at least the subscriber identifications of all of the other subscriber stations so that one of the stations can be selected.

18 Claims, 6 Drawing Sheets

TELECOMMUNICATION PROCESS AND DEVICE SUITABLE FOR CARRYING OUT THE PROCESS

BACKGROUND OF THE INVENTION

This invention relates to the telecommunication devices and a process employing such devices for telecommunication between a plurality of subscriber station under control of a switching center which stores call numbers from the respective subscriber station.

The invention relates to a telecommunication process according to the preamble of Patent claim 1 and a telecommunication device, suitable for carrying out this process, according to the preamble of Patent claim 8.

A telecommunication process between a plurality of subscriber stations under the control of a switching centre which stores call numbers of the respective subscriber stations is already known. The switching centre has a store in which a list of subscribers is stored, the said list containing call numbers assigned to the respective subscriber stations. These call numbers can be dialled by means of the subscriber stations in order to set up a communication link to other subscriber stations. The communication link here can be wire-conducted or in the form of a radio link. In the last case the subscriber stations can also be mobile phones.

The telecommunication device can for example be realized in the form of a public network or in the form of a private network. In the last case, the said telecommunication device could be realized in a company, an institution or in a private household as a so-called residential cordless system.

A problem with all these telecommunication devices is that when there is a relatively large number of subscriber stations a subscriber can no longer remember the individual call numbers. He is then obliged to use the customary call number directory which, however, is frequently not at hand. This is particularly the case if the subscriber stations are portable stations.

SUMMARY OF THE INVENTION

The invention is based on the object of providing a telecommunication process of the type mentioned at the beginning which simplifies the dialling of another subscriber station. In addition, it is intended to make an appropriate telecommunication tion device available.

The way of achieving the object set in terms of a process of telecommunication between a plurality of subscriber stations, wherein the telecommunication is accomplished under control of a switching center which stores call numbers of the respective subscriber stations. In contrast, the way of achieving the object set in terms of the device is obtained by providing the switching center with a store for storing a subscriber list in which call numbers assigned to the respective subscriber stations is contained. Advantageous refinements of the invention can be found in the respective dependent subclaims.

A telecommunication process according to the invention is characterized in that each subscriber station requests registration at the switching centre with an additional subscriber identification and the said switching centre assigns the additional subscriber identification to the respective call number, and in that the switching centre transfers at least the subscriber identifications of all the subscriber stations to each subscriber station so that one of them can be selected there.

In this way, dialling one subscriber station from another subscriber station is made considerably easier since now at least a list of the subscriber identifications of all the subscriber stations is available to the calling subscriber directly in his subscriber station and, on the other hand, the subscriber can orient himself during the selection of a desired subscriber station by using the subscriber identifications. Alternatively, the call numbers can also be transmitted to the calling subscriber station together with the subscriber identification so that the subscriber identification can either be used alone or else together with the associated call number in order to set up a communication between the calling subscriber station and a called subscriber station.

Preferably alphanumeric characters, for example letters or character combinations which can be remembered particularly easily, are used as subscriber identifications. The subscriber identifications can then be selected freely or sequentially from the list of subscriber identifications transmitted to the calling subscriber station. For sequential selection, it is possible for example to "leaf through" or "scroll through" the subscriber list. In this context it is advantageous to arrange the subscriber identifications alphabetically in the subscriber list in order to make it even easier to find another subscriber station.

According to one refinement of the process according to the invention, the subscriber identifications which are transmitted to the switching centre by the respective subscriber stations are permanently stored, together with the call numbers, in the switching centre alone and transferred to the calling subscriber station in response to a request signal. Therefore, if a subscriber station is actuated in order to set up a communication link to another subscriber station, the subscriber identifications, and, if appropriate, also the call numbers contained in the subscriber list are temporarily transmitted to the calling subscriber station. This subscriber list is buffered there for the purpose of viewing, it being possible for the subscriber list also to be transmitted to the calling subscriber station sequentially or in portions in order to reduce the storage space required for buffering in the calling subscriber station.

It is advantageous with this procedure that the subscriber identifications or call numbers transmitted to the calling subscriber station are always updated. Moreover, there is a saving in storage space in the subscriber station if sequential transmission or transmission in portions is used.

According to another refinement according to the invention, the subscriber identifications transferred to the subscriber stations, and if appropriate, also the associated call numbers are permanently stored in the respective subscriber stations. This can be brought about in a compulsory fashion under the control of the switching centres. Here, of course, the storage of the subscriber list in the switching centres is retained. In this case, each subscriber station must be capable of making available the storage space required for this purpose.

It is advantageous with this last-mentioned procedure that the subscriber list is available in the subscriber station at all times and can be viewed before a call is set up so that fewer waiting times occur when setting up calls.

When the subscriber identifications and, if appropriate, the associated call numbers of all the subscriber stations are permanently stored in the respective subscriber stations, there is provision for the said subscriber identifications stored in the subscriber stations and, if appropriate, the associated call numbers to be updated. This can be initiated by the switching centre in a compulsory fashion, for example by means of a single point-to-multipoint message at specific time intervals.

However, the updating of a subscriber station can also be carried out by the subscriber himself in that, for example, he makes the subscriber station transmit an appropriate update instruction to the switching centre.

A telecommunication device according to the invention is characterized in that each subscriber station has input means for inputting a subscriber identification and first control means for transmitting the input subscriber identification to the switching centre, the switching centre contains a second control means which store the respectively received subscriber identification together with the call number of the corresponding subscriber station in the subscriber list and by means of which all the subscriber identifications stored in this way can be transmitted to each of the subscriber stations, and in that each subscriber station has selection means for selecting one of the subscriber identifications transmitted to it. At the same time, the second control means can also transmit the entire subscriber list (subscriber identification+call numbers) to all the subscriber stations.

Each of the subscriber stations can be designed to generate a request signal which is transmitted to the switching centre in order to receive the subscriber identifications, or the subscriber list, from there.

This request signal is broadcast for example if the subscriber list permanently stored in the switching centre is to be transmitted temporarily to the calling subscriber station.

In the case of central storage of the subscriber list in the switching centre alone, the request signal is generated by a subscriber station when a call setup takes place between it and the switching centre. This can however result in waiting times while the communication link is being established since now the identifications or subscriber list have to be looked through. However, if the identifications, or subscriber list, are transmitted sequentially or in portions, there can be a saving in storage space in the subscriber station, as already mentioned.

If the identifications of all the subscriber stations, or the subscriber list, are to be stored permanently not only in the switching centre but also in a decentralized way in all the subscriber stations, when a respective subscriber station is first taken into service the subscriber identifications, or the subscriber list, are compulsorily transmitted under the control of the switching centre, as already mentioned. However, if it is not possible to contact a subscriber station, the said station can generate an appropriate request signal later in order to receive the aforesaid data. In this case, the request signal can therefore be produced by a subscriber station before a call setup takes place between it and the switching centre. The time required for the call setup is thus reduced considerably.

According to a further refinement of the invention, the request signal can be generated manually. It can be generated for example by actuating a suitable key on the subscriber station.

According to another refinement of the invention, the selection means are designed for sequentially selecting subscriber identifications. For example, the selection means can be in the form of arrow or cursor keys so that the list of subscriber identifications can be looked through in different directions in a line-sequential fashion. Desired subscriber identifications can however also be input in a freely selectable way by actuating keys.

According to a further advantageous refinement of the invention, the request signal can be generated whenever the selection means are actuated. As a result, it is possible to implement a system in which, for example when the subscriber list is being looked through sequentially, only the subscriber identifications or call number of one subscriber station have to be transmitted successively to the calling subscriber station, as a result of which the storage space required for this in the calling subscriber station can be reduced to a minimum.

BRIEF DESCRIPTION OF THE DRAWING

The drawing shows exemplary embodiments of the invention. In the said drawing.

DETAILED DESCRIPTION OF THE INVENTION

Two exemplary embodiments of the telecommunication device according to the invention are described in detail below. FIGS. 1, 3, 6 and 8 relate to the first exemplary embodiment while FIGS. 2, 4, 5, 7 and 9 relate to the second exemplary embodiment.

The basic idea of the invention consists in each new subscriber initially entering his name, his location or another suitable, preferably alphanumeric subscriber identification into his subscriber station manually in order to set up the telecommunication device. This subscriber identification is then stored in such a way that it is available to every other subscriber, or subscriber station, in a list from which the other subscriber can select the party he wishes to call when setting up, or before setting up, a telephone call for example. Two basic variants are distinguished here:

Central storage: the subscriber list is stored in a central station, that is to say a switching centre or base station and is transferred to each subscriber on request, for example during a call setup.

Decentralized storage: here, the subscriber list is also stored in the central station, that is to say the switching centre or base station and is furthermore transferred immediately after updating to all the subscriber stations which can be contacted. Subscriber stations which are contacted later receive the subscriber list from the switching centre on request. In order to achieve this, after the subscriber station is switched on, an appropriate request signal can be transmitted automatically by the subscriber station to the switching centre. Therefore, with decentralized storage the subscriber list is stored permanently both in the switching centre and in each subscriber station.

The subscriber list itself consists of a list of subscriber identifications, which are preferably alphanumeric in form, and a list of telephone numbers, in each case one telephone number and one subscriber identification belonging together.

Figure 1:
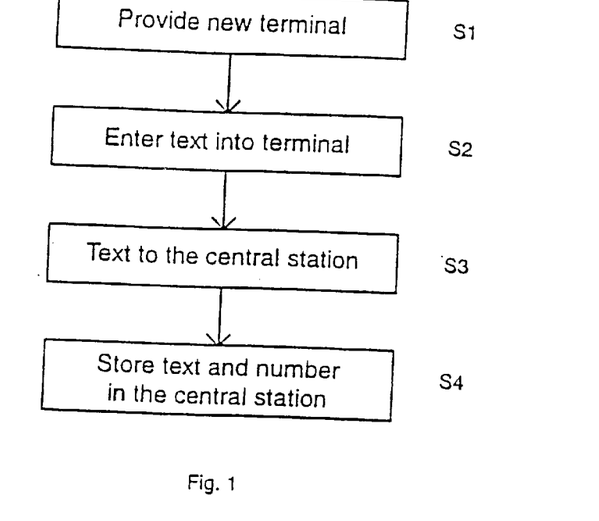
FIG. 1 shows a flow diagram relating to the registering of a subscriber station in case of exclusively centralized data storage.

The registering of a new subscriber for the case of centralized storage of the subscriber list is described below in greater detail with reference to FIG. 1.

Firstly, a new subscriber station which can also be designated as a terminal, is provided in step 1. When a new subscriber requests registration, for example when a new terminal is taken into service, the name of the user, the location of the terminal or another text which is characteristic of the subscriber are entered into the terminal as subscriber identification. This takes place in step 2. For this, it must be possible for alphanumeric characters to be input into the terminal. A display for displaying the entered alphanumeric characters should also be present in order to monitor the entries.

The entered text or the subscriber identification is transmitted to the central station in step S3 by means of a suitable signalling facility depending on the telecommunication system or location used. The entered subscriber identification is then stored in the central station or the switching centre together with the new subscriber number or call number which is allocated by the switching centre. The subscriber list stored in the switching centre therefore consists in each case of call numbers with assigned subscriber identifications.

Figure 2:
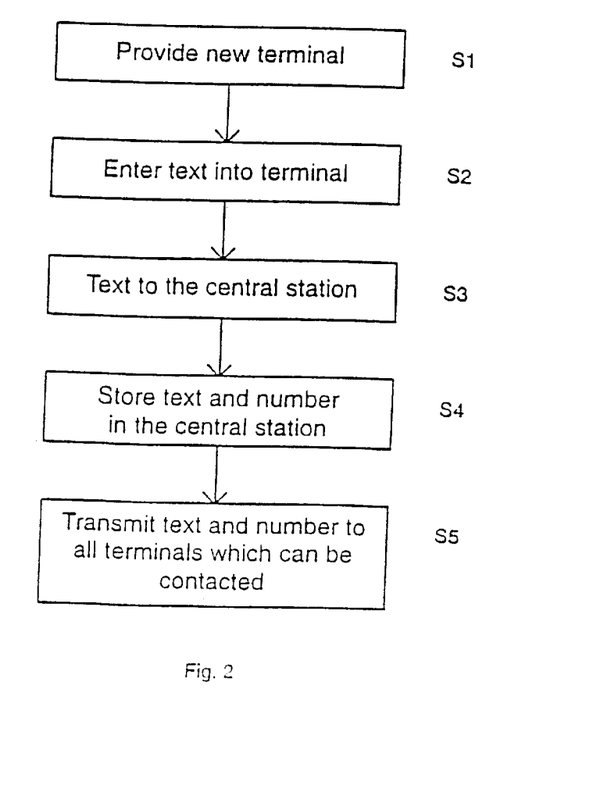
FIG. 2 shows a flow diagram relating to the registering of a subscriber station in case of decentralized data storage.

The registering of a new subscriber for the case of decentralized storage will now be described in greater detail with reference to FIG. 2.

The registering procedure begins, as for centralized storage, with steps S1 to S4.

However, after the subscriber identification and the call number of the new subscriber or of the new subscriber station are stored in the switching centre, these data are again transmitted to all the other subscriber stations which can be contacted, by means of a suitable signalling facility dependent on the telecommunication system or location used. They are stored there permanently. This takes place in step 5. At the same time, the data can be transmitted to the respective subscriber stations in such a way that in each case the entire updated subscriber list is transmitted, or only the newly added part.

Figure 5:
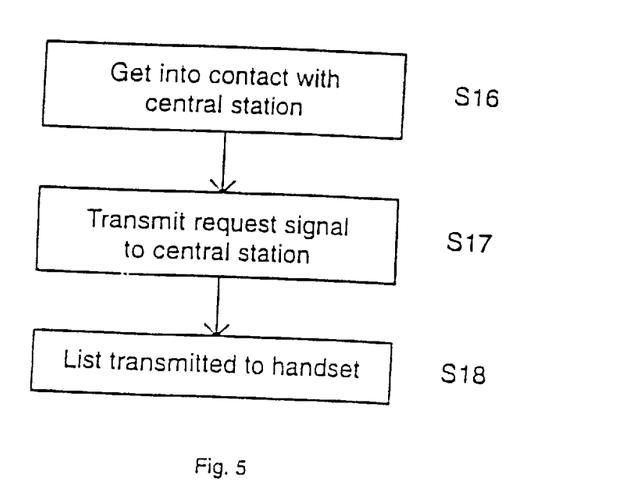
FIG. 5 shows a flow diagram relating to the situation when a subscriber station gets into contact to the switching centre in case of decentralized data storage.

Subscribers or subscriber stations which cannot be contacted at this time must explicitly request the updated subscriber list after it becomes possible to contact them; closer details on which are given with reference to FIG. 5.

Figure 3:
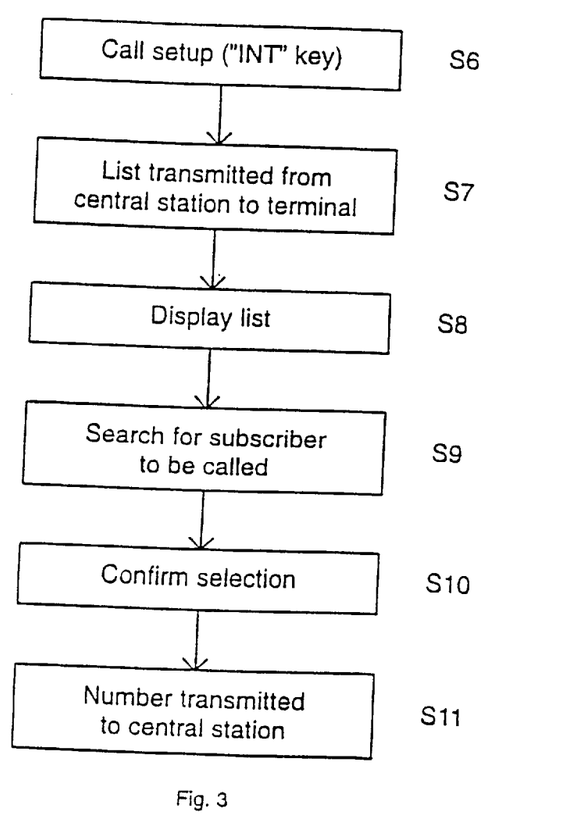
FIG. 3 shows a flow diagram relating to the call setup in case of exclusively centralized data storage.

A call setup for the case of centralized storage of the subscriber list is now described with reference to FIG. 3.

In order to make the subscriber list available to the subscriber, the said list must firstly be requested by the subscriber station from the switching centre.

In order to bring this about a request signal for a call setup is transmitted from the subscriber station to the switching centre, specifically in step S6. This request signal is generated as a result of the subscriber actuating a suitable key INT on the subscriber station.

The switching centre responds to the request signal by, for example, transmitting the entire subscriber list to the calling subscriber station so that the subscriber list can be buffered in the subscriber station. This takes place in step S7.

Individual entries, or groups of entries, from the transmitted subscriber list are then displayed on a display device of the subscriber station in step S8.

In step S9, a desired subscriber or person to be called is selected from the list.

This can take place in that, for example, arrow keys of the subscriber station are pressed so that the subscriber list can be searched through in different directions. During this process, the different entries are respectively represented on the display device.

If the desired subscriber has been found and the corresponding entry of the subscriber list is in a predetermined field of the display device, the selection of the subscriber is confirmed in step S10. For this purpose, a confirmation key "CNF" on the subscriber station is pressed. At the same time, the call number assigned to the selected subscriber identification is transmitted as selected information to the switching centre. This takes place in step S11.

If the display device of the subscriber station consists of only one line, it is not necessary to ensure that the information of the selected subscriber is located in a specific field of the display device in order to confirm his selection by actuating the "CNF" key.

It is also not absolutely necessary to search through the subscriber list sequentially by actuating arrow keys, but instead it is also possible to enter the subscriber identification or call number of a desired subscriber directly, specifically by correspondingly actuating keys in step S9 so that the search process is made easier. Afterwards, the steps S10 and S11 are then run through again.

In the event that the switching centre only ever sends one entry from the subscriber list to the calling subscriber station when the request signal is received. further entries can be requested, for example by pressing arrow keys. In this case, a new request signal to the switching centre is emitted every time the key is pressed, to which the switching centre replies by transmitting the next desired entry of the subscriber list. In this case, the storage space required for temporarily storing subscriber data in the subscriber station can be minimized.

Of course, it is also conceivable to transmit groups of entries of the subscriber list from the switching centre to the subscriber station, which entries can then also be requested one after the other by pressing the arrow keys. The aforesaid arrow keys can of course also be used to search through the individual groups but their function must then be appropriately changed. For this purpose, a suitable switch-over device can be provided which on the one hand causes a request signal to be transmitted when the arrow keys are actuated and on the other hand enables a group of entries to be searched through when the arrow keys are actuated. The switching over can take place automatically, for example when the last entry of a group is reached.

Figure 4:
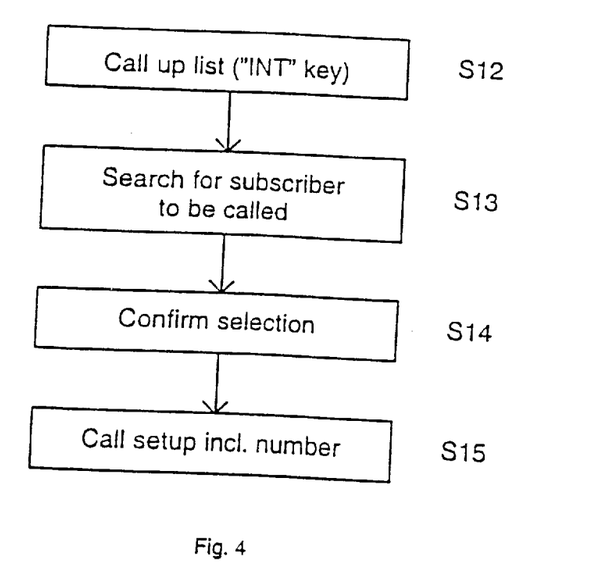
FIG. 4 shows a flow diagram relating to the call setup in case of decentralized data storage.

FIG. 4 relates to the call setup with decentralized storage of the subscriber list and is described below.

Firstly, in step S12 the subscriber list which is permanently stored in the subscriber station is called up. This is achieved by actuating the INT key. Afterwards, in step S13 a desired subscriber or person to be called is selected. This can take place sequentially, as in the case in FIG. 3, by actuating the arrow keys or by entering a known subscriber identification or call number by actuating keys. Afterwards, in step S14 the selection of the subscriber is confirmed. This is achieved by pressing the "CNF" key. Pressing the "CNF" confirmation key initiates the call set up. In step S15, the call number of the selected subscriber is transmitted as dialling information to the switching centre.

In the present case with decentralized storage of the subscriber list it is always possible to prepare the call number in the "on hook" state and then subsequently set up the call, or to set up the call first and then enter the call number. The former case was described above.

It has already been mentioned at the beginning that in the case of decentralized storage of the subscriber list a subscriber station is not capable, under all circumstances, of receiving the subscriber list broadcast by the switching centre. There may be various reasons for this, for example the device is switched off or defective, the device is busy with higher priority processes and its capacity is fully utilized, the capacity of the entire telecommunication system is fully utilized or the devise is outside the coverage area (in the case of devices which operate on the basis of radio transmission).

As soon as the device resumes contact with the central station, which is indicated in step S16, it must request that the central station or switching centre transfer the updated subscriber list to it, specifically according to step S17. This takes place by means of suitable signalling, dependent on the telecommunication device used. In step S18, the switching centre then transmits the subscriber list to the terminal or the subscriber station.

There are various possibilities for the type and scope of the data transferred to the subscriber station by the switching centre:

1. The entire subscriber list is transmitted whenever a request is made.
2. The request signal transmitted from the subscriber station to the switching centre contains a note (version number or date/time) indicating the update state of the list stored in the terminal. If the switching centre detects that this subscriber list has changed since then, the entire subscriber list is transmitted again.
3. The request signal contains a note (version number or date/time) indicating the update state of the list stored in the terminal. The switching centre only transmits data which have changed since then.

In contrast with the centralized storage of the subscriber list, the decentralized storage of the subscriber list requires some additional outlay:

A large store in the terminal is necessary in any case. With purely centralized storage, however, the size of store required in the terminal depends on whether the entire subscriber list or only parts of it are transmitted during the call setup.

After a new subscriber has been registered, all the other subscribers must be informed of this. Depending on the telecommunications system used, this can be carried out, however, in a single point-to-multipoint message.

An additional request signal is necessary in order to request the subscriber list after it becomes possible for the subscriber station to contact the central station in the case of FIG. 5.

On the other hand, however, the subscriber list is available at all times in the subscriber station. The result of this is that the call setup does not have to take place unnecessarily early and ensures that there are no waiting times during the call setup.

The setup of a telecommunication device according to the invention is described in greater detail below with reference to FIG. 6. A cordless telephone system for private use, in which the subscriber list is permanently stored in the switching centre alone, serves as the example.

The telephone system consists of a switching centre 1 which contains a radio frequency part 3, connected to an aerial 2, for transmitting and receiving signals. The radio frequency part 3 is connected to a signal processing component 4 which itself is connected to a central processor unit 5. This central processor unit 5 is connected to a store 6 which serves to store a subscriber list 7. The subscriber list 7 contains subscriber identifications A, B, C, as well as call numbers 001, 002, 003, . . . each call number being assigned to a subscriber identification.

In this case, the telephone system includes three portable handsets 8, 9 and 10 which are connected to the switching centre 1 via a radio link 11.

The handsets 8, 9 and 10 are all of the same design, as described in greater detail with respect to handset 8.

Handset 8 contains a radio frequency part 13, connected to an aerial 12, for transmitting and receiving signals. The radio frequency part 13 is connected to a signal processing part 14, and the latter is connected to a central processor 15. The central processor unit 15 is connected to a display device 16, a store 17 and a keypad 18. The keypad 18 comprises an INT key 19, a "CNF" key 20, two arrow or cursor keys 21 and 22, and a number of alphanumeric or letter keys 23, 24 and 25.

The display 16 serves to display one entry of the subscriber list 7 in each case, one entry comprising the subscriber identification and the assigned call number of the subscriber. The subscriber list 7 itself is requested by the switching centre 1 and all of the subscriber list 7, or portions thereof, are stored in the store 17.

How a new handset 8, 9, 10 requests registration at the switching centre 1 has already been described with reference to FIG. 1. The call setup for the case of centralized storage of the subscriber list 7 and the transmission of this list to the calling handset has been described with reference to FIG. 3. Therefore, reference will only be made below to FIG. 8, which shows the time sequences once more in detail.

Figure 8:
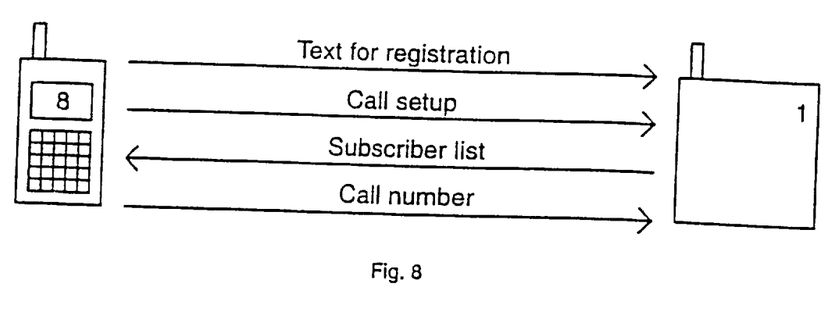
FIG. 8 shows signals between a switching centre and a subscriber station in case of exclusively centralized data storage.

Firstly, when a new handset requests registration, the text or the subscriber identification is entered by means of the alphanumeric keys 23 to 25. Only three are illustrated here. There may also be more. The subscriber identification is then transmitted via the radio link 11 to the switching centre 1 and stored there in the store 6. The central processor unit 5 then assigns a call number to this subscriber identification. This takes place for all the mobile phones which request registration so that finally a subscriber list 7 is produced in the store 6. In the present case, the handset 8 has the subscriber identification A and the call number 001, the handset 9 has the subscriber identification B and the call number 002 and the handset 10 has the subscriber identification C and the call number 003.

If a call setup is to take place now, the INT key 19 is pressed. This results in the subscriber list 7 being transmitted via the radio link 11 to the calling handset, in this case the mobile phone 8. The subscriber list 7 is stored in this handset 8, specifically in the store 17. In this case, the entire subscriber list 7 is transmitted into the store 17.

Using the arrow keys 21 and 22, the subscriber list 7 present in the store 17 can then be searched through. At the same time, in each case a data set comprising the subscriber identification and associated call number is presented on the display 16. The subscriber list 7 in the store 17 can therefore be run through and interrogated sequentially using the arrow keys 21 and 22.

If a desired subscriber identification has been found, the "CNF" key 20 is pressed, which results in the call number assigned to this subscriber identification being transmitted via the radio link 11 to the switching centre 1. The latter then calls the corresponding handset.

Figure 6:
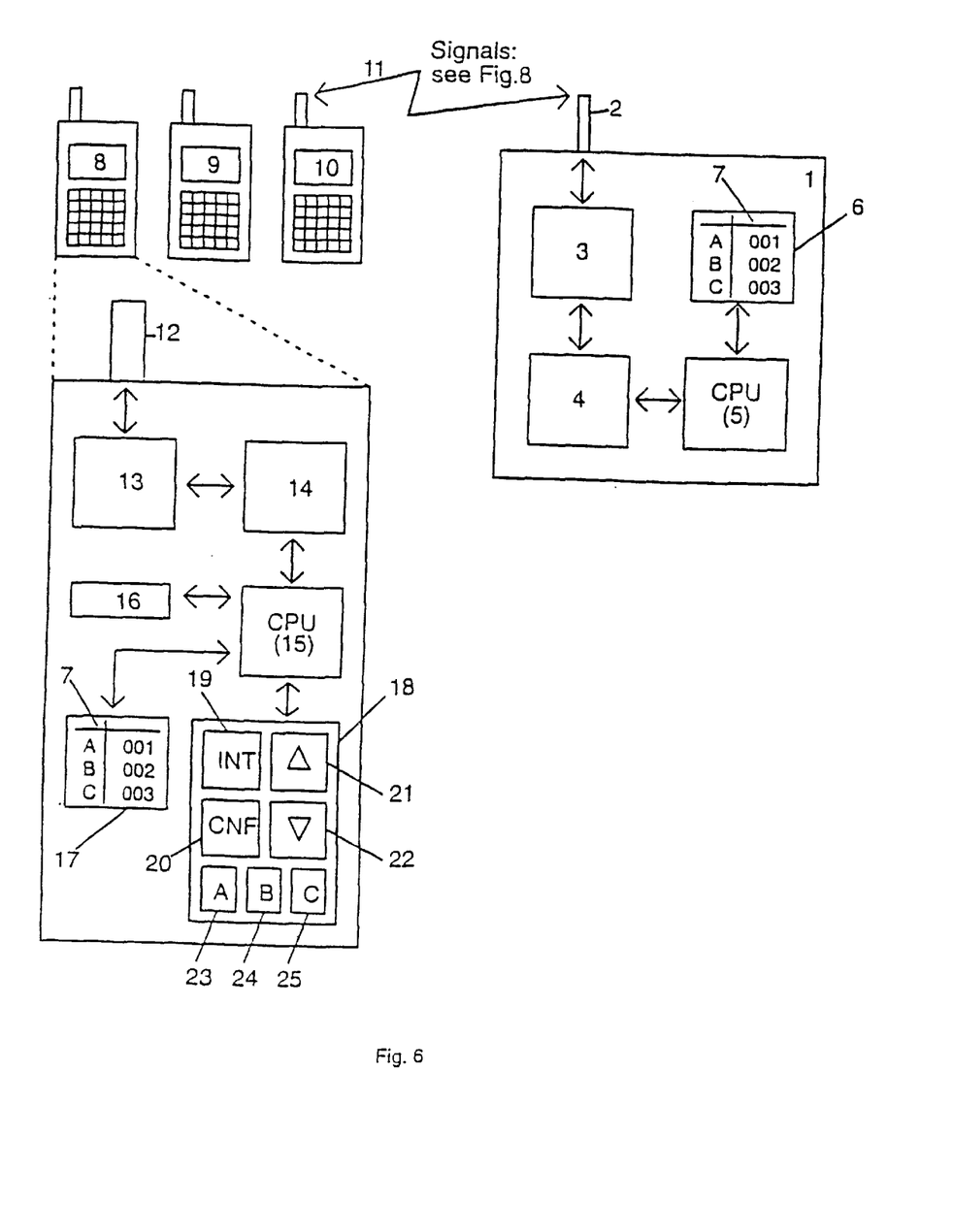
FIG. 6 shows a block circuit diagram of a telecommunication device with exclusively centralized data storage.
Figure 7:
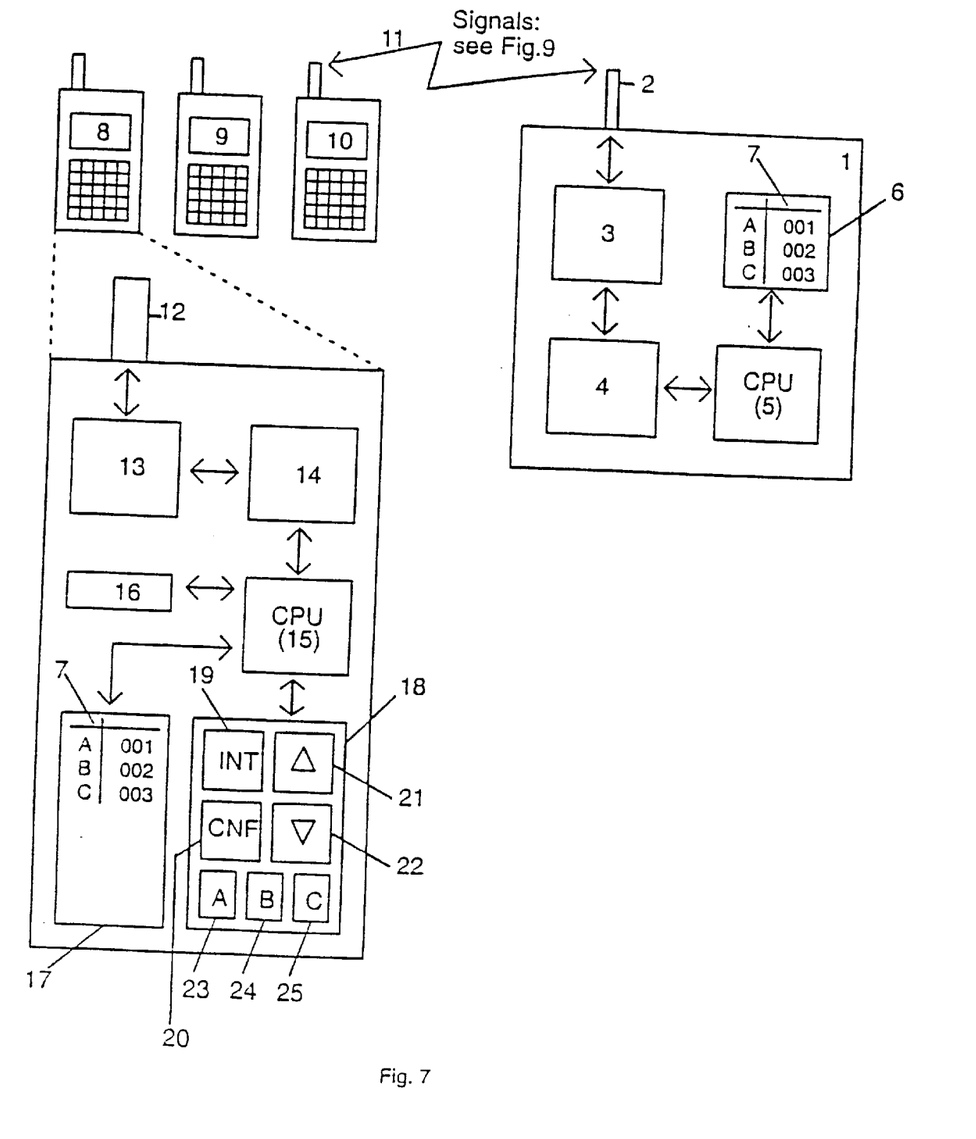
FIG. 7 shows a block circuit diagram of a telecommunication device with decentralized data storage.

FIG. 7 shows the setup of a similar telecommunication device to that in FIG. 6 but now for the case of decentralized, permanent storage of the subscriber list 7 in each of the handsets 8, 9 and 10.

The registering of a new handset in this system has already been described with reference to FIG. 2, and the calling up of the subscriber list and the call setup has been described with reference to FIG. 4. Therefore, only the signals exchanged between the base station and the handsets will explained below with reference to FIG. 9.

Figure 9:
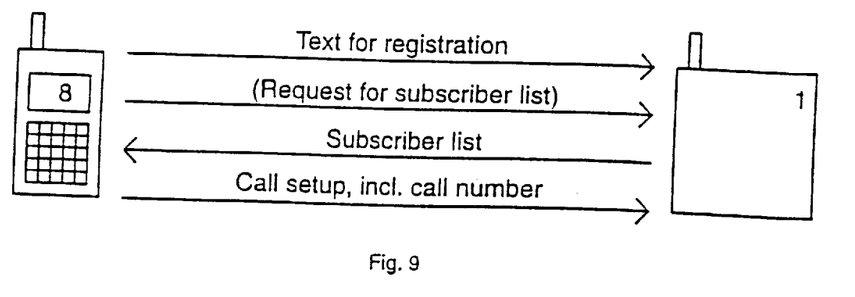
FIG. 9 shows signals between a switching centre and a subscriber station in case of decentralized data storage.

Firstly, when a new handset requests registration the text, or the subscriber identification, is again input here by actuating the alphanumeric keys 23, 24, 25. The subscriber identification is then transmitted via the radio link 11 into the store 6 of the switching centre 1 so that a corresponding call number can be assigned to it there by the CPU 5. The same applies for all newly registered handsets so that ultimately the subscriber list 7 is present in the store 6.

If the switching centre 1 detects that a new handset has been registered, it automatically transmits the updated subscriber list 7 via the radio link 11 into the store 17 of all the handsets, if the latter permit it. The subscriber list 7 is then permanently stored in the stores 17 of the handset.

By actuating the INT key 19, the subscriber list 7 is now called up in the store 17.

Now, a desired subscriber is selected by means of its identification using the arrow keys 21 and 22. For this purpose, the subscriber list 7 can be searched through sequentially in different directions. In each case one subscriber identification with associated call number is presented by means of the display device 16.

When a desired subscriber has been found, the "CNF" key 20 is pressed, as a result of which the call setup is initiated. In this case, the call number of the selected subscriber is transmitted from the calling handset to the switching centre 1 which then dials the subscriber to be called.

It is to be noted that it is not absolutely necessary for the call numbers of the respective subscribers to be present both for the case of centralized and decentralized storage of the subscriber list. The call numbers can also remain in the store 6 of the switching centre 1. Access to these call numbers is then made via the subscriber identifications transmitted to the switching centre 1.

A software solution of the process according to the invention will also be described below.

A cordless telephone system for private use according to the DECT (Digital European Cordless Telecommunication) standard serves as an example.

The system comprises a base station (switching centre) and up to six handsets (subscriber stations) which are connected to the base station via a radio link. The handsets have single-digit internal call numbers (1 . . . 6) which are allocated in ascending order.

The centralized storage with transmission of the entire subscriber list during a call setup is used here. The signals exchanged between the base station and handset during the call setup are used for transmission.

As is customary in telephone systems, a distinction is made between internal and external calls. In connection with the invention described, only the internal calls, i. e. calls between handsets of the same system, are treated here.

When a new subscriber requests registration, the new handset must be registered at the base station. During the corresponding procedure of the user interface (which is not described here), the user enters his name or the customary location of the handset.

After this procedure is terminated, the actual registration occurs in that an

ACCESS-RIGHTS-REQUEST message is transmitted from the handset to the base station. This message contains the input text (for example in the IWU-TO-IWU information element). The further registration procedure takes place as described in the standard.

During a call setup, an internal call is set up by pressing the "INT" key. Pressing this key triggers the transmission of a CC-SETUP message from the handset to the base station. This message contains the information that the call is an internal one.

The base station responds with a CC-SETUP-ACK message (others are possible) which contains the subscriber list (e.g. in the IWU-TO-IWU information element). The first entry of the list (text and number) is made available to the user. He can either select the desired internal call number or scroll through the subscriber list with the arrow keys until the desired number is displayed. The person to be called is selected by pressing the "CNF" key (this can correspond to the "INT" or the "off-hook" key). The internal call number of the person to be called is sent as dialling information to the base station in a CC-INFO message. The rest of the call setup takes place as described in the standard.

What is claimed is:

1. A process of telecommunication among a plurality of subscriber stations under control of a switching center, comprising steps of:

storing, within the switching center, call numbers of the respective subscriber stations;

requesting, by each of said subscriber stations, registration with an additional subscriber identification from the switching center;

assigning, by the switching center, the additional subscriber identification to call numbers of the respective subscriber stations; and transferring to each of the subscriber stations the additional subscriber identification of respective ones of all the subscriber stations, thereby enabling a subscriber station to select another of said plurality of subscriber stations.

2. Telecommunication process according to claim 1, wherein the subscriber identifications are permanently stored, together with the call numbers in the switching center alone, and are transferred to the calling subscriber stations in response to a request signal.

3. Telecommunication process according to claim 1, wherein the subscriber identifications which are transferred to the subscriber stations are permantently stored, if appropriate with the associated call numbers, in the respective subscriber stations.

4. Telecommunication process according to claim 3, wherein the subscriber identifications which are transferred to the subscriber stations, and if appropriate, the associated call numbers, are updated.

5. Telecommunication process according to claim 4, wherein the updating takes place when the subscriber stations transmit an update instruction.

6. Telecommunication process according to claim 1, wherein the subscriber identifications are selected sequentially or in a freely selectable manner.

7. Telecommunication process according to claim 1, wherein sequences of alphanumeric characters serve as subscriber identifications.

8. A telecommunication system for communication among a plurality of subscriber stations, the system comprising a switching center for effecting communication among the subscriber stations;

wherein said switching center includes a store for storing a subscriber list of call numbers assigned to respective ones of said subscriber stations;

each of said subscriber stations comprises input means for inputting a subscriber identification, and first control means for transmitting inputted subscriber identifications to said switching center;

said switching center comprises a second control means for storing subscriber identifications, received from respective ones of said subscriber stations, together with call numbers of corresponding subscriber stations in the subscriber list;

said storing of the subscriber identifications by said second control means enabling transmission of said subscriber identifications to each of said plurality of subscriber stations; and each of said plurality of subscriber stations furthermore comprises selection means for selecting one of said subscriber identifications transmitted to the subscriber station by said switching center.

9. Telecommunication system according to claim 8, wherein the entire subscriber list can be transmitted to all the subscriber stations by the second control means.

10. Telecommunication system according to claim 8, wherein the subscriber identifications and a subscriber list can be stored permanently in the switching centre, and can be transmitted in portions, or entirely, to a requesting subscriber station and temporarily stored there.

11. Telecommunication system according to claim 10, wherein in each subscriber station, a request signal can be generated which is transmitted to the switching centre in order to receive the subscriber identifications, or the subscriber list, from there.

12. Telecommunication system according to claim 10, wherein a request signal can be generated by a subscriber station after a call setup has begun between said subscriber station and the switching centre.

13. Telecommunication system according to claim 10, wherein a request signal can be generated manually or automatically.

14. Telecommunication system according to claim 8, wherein the subscriber identifications or the subscriber list, can be stored permanently in the switching centre, and transmitted in portions, or entirely, to all the subscriber stations and stored permanently there.

15. Telecommunication system according to claim 14, wherein a request signal can be generated by a subscriber station before a call setup takes place between said subscriber station and the switching centre.

16. Telecommunication system according to claim 8, wherein said selection means are designed for sequentially selecting individual ones of said subscriber identifications.

17. Telecommunication system according to claim 16, wherein a request signal can be generated whenever said selection means are actuated.

18. Telecommunication system according to claim 8, wherein said selection means are designed for freely selecting individual ones of said subscriber identifications.

* * * * *